United States Patent
Graupner et al.

(10) Patent No.: US 8,024,736 B1
(45) Date of Patent: Sep. 20, 2011

(54) SYSTEM FOR CONTROLLING A DISTRIBUTION OF UNUTILIZED COMPUTER RESOURCES

(75) Inventors: Sven Graupner, Mountain View, CA (US); Tilo Nitzsche, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1403 days.

(21) Appl. No.: 11/046,334

(22) Filed: Jan. 28, 2005

(51) Int. Cl.
*G06F 9/46* (2006.01)
*G06F 15/173* (2006.01)

(52) U.S. Cl. ........................ 718/104; 709/226
(58) Field of Classification Search .................. 718/104, 718/105, 100, 102; 709/226
See application file for complete search history.

(56) References Cited

U.S. PATENT DOCUMENTS

| | | | |
|---|---|---|---|
| 5,708,974 A * | 1/1998 | Smith | 455/62 |
| 7,249,179 B1 * | 7/2007 | Romero et al. | 709/226 |
| 7,308,687 B2 * | 12/2007 | Trossman et al. | 718/104 |
| 7,500,001 B2 * | 3/2009 | Tameshige et al. | 709/226 |
| 2002/0016812 A1 * | 2/2002 | Uchishiba et al. | 709/104 |
| 2003/0037092 A1 * | 2/2003 | McCarthy et al. | 709/104 |
| 2006/0143617 A1 * | 6/2006 | Knauerhase et al. | 718/104 |
| 2008/0248823 A1 * | 10/2008 | Morita | 455/509 |

OTHER PUBLICATIONS

Ahmed, K. et al., "The Cluster as Server: An Integrated Approach to Managing HPC Clusters", Nov. 2002.
Foster, I. et al., "The Grid: Blueprint for a New Computing Infrastructure", Morgan Kaufmann Publishers, ISBN, 1999, p. 270-293.
HP Utility Data Center, http://www.hp.com/go/hpudc, downloaded Jan. 25, 2005.
SmartFrog, http://www.smartfrog.org, downloaded Jan. 25, 2005.
Web Services Management Framework, Version 2.0, http://devresource.hp.com/drc/specifications/wsmf/index.jsp, downloaded Jan. 26, 2005.
IBM : xCAT, Extreme Cluster Administration Toolkit, http://www.alphaworks.ibm.com/tech/xCAT, downloaded Jan. 26, 2005.
Globus: Monitoring and Discovery Service (MDS), http://www.globus.org/mds/mds2, downloaded Jan. 26, 2005.
Global Grid Forum: Open Grid Services Infrastructure v1.0, http://www.gridforum.org/, Jun. 2003.
Oasis: Universal Description, Discovery and Integration (UDDI), http://www.uddi.org, downloaded Jan. 26, 2005.
Sun Microsystems: Sun Grid Engine, http://www.sun.com/software;gridware, downloaded Jan. 26, 2005.

* cited by examiner

*Primary Examiner* — Meng An
*Assistant Examiner* — Tammy Lee

(57) ABSTRACT

Computer resources from a pool of resources are allocated for executing an application. An amount of unutilized resources in the pool of resources is determined. One or more sets of resources previously allocated to execute the application are selected, and the unutilized resources are distributed among the sets of resources.

17 Claims, 8 Drawing Sheets

| PARAMETER SET<br>SERVER GROUPS | p1 | p2 | p3 | p4 | p5 | p6 | p7 | ... | pi |
|---|---|---|---|---|---|---|---|---|---|
| sg 1 |  | 4 |  |  |  |  | 60 |  |  |
| sg 2 |  | 8 |  |  |  |  | 60 |  |  |
| sg 3 |  | 2 |  |  |  |  | 75 |  |  |
| sg 4 | 1760 | 22 |  |  |  |  | 80 |  |  |
| sg 5 |  | 12 |  |  |  |  | 80 |  |  |
| sg 6 | 800 | 16 |  |  |  |  | 50 |  |  |
| ... |  | ... |  |  |  |  | ... |  |  |
| sg j |  | 8 |  |  |  |  | 80 |  |  |

*FIG. 4A*

| SERVER GROUPS | Dsur |
|---|---|
| sg 1 | 0 |
| sg 2 | 0 |
| sg 3 | 0 |
| sg 4 | +2 |
| sg 5 | 0 |
| sg 6 | +4 |
| ... | ... |
| sg j | 0 |

FIG. 4B

| PARAMETER SET | a1 | a2 | a3 | a4 | a5 | a6 | a7 | ... | ai |
|---|---|---|---|---|---|---|---|---|---|
| SERVER GROUPS | | | | | | | | | |
| sg 1 | | | | | | | 0 | | |
| sg 2 | | | | | | | 0 | | |
| sg 3 | | | | | | | 0 | | |
| sg 4 | 1760 | →+2 | | | | | -7 | | |
| sg 5 | | | | | | | 0 | | |
| sg 6 | 800 | →+4 | | | | | -10 | | |
| ... | | ... | | | | | ... | | |
| sg j | | 8 | | | | | 0 | | |

FIG. 4C

SYSTEM FOR CONTROLLING A DISTRIBUTION OF UNUTILIZED COMPUTER RESOURCES

TECHNICAL FIELD

This technical field relates generally to controlling a distribution for unutilized computer resources.

BACKGROUND

Grid computing services, utility-based data centers, and other types of resource-on-demand systems are becomingly increasingly popular as a means for efficiently and cost-effectively taking advantage of computer resources to meet the computing demands of users. However, managing these resource-on-demand systems is a difficult task that conventional network management software is not equipped to handle.

Many management tasks are performed manually, which tends to be time consuming and costly. For example, selecting computer resources from a pool of resources to assign to a particular user's computing demands is typically performed manually. The monitoring of the pool of resources may be performed using conventional management tools. However, the decision of which resources to select for a user's computing demands or whether to reassign resources after initially selecting resources is performed by a system administrator. In addition, current resource-on-demand systems may not efficiently utilize available resources from the resource pool. For example, in many systems, resources remain idle and unused if not assigned to a particular user, even if assigning the idle resources may result in increased efficiency for the user's applications.

SUMMARY

According to an embodiment, computer resources from a pool of resources are allocated for executing an application. An amount of unutilized resources in the pool of resources is determined. One or more sets of resources previously allocated to execute the at least one application are selected, and the unutilized resources are distributed among the sets of resources.

BRIEF DESCRIPTION OF THE DRAWINGS

Various features of the embodiments can be more fully appreciated, as the same become better understood with reference to the following detailed description of the embodiments when considered in connection with the accompanying figures, in which:

FIG. 4A illustrates a data structure for holding parameter sets from control plug-ins, according to an embodiment;

FIG. 4B illustrates a vector which contains the number of unutilized servers that are to be assigned to sets of allocated resources, according to an embodiment;

FIG. 4C illustrates a data structure for holding changes for parameter sets, according to an embodiment;

DETAILED DESCRIPTION

For simplicity and illustrative purposes, the principles of the embodiments are described. However, one of ordinary skill in the art would readily recognize that the same principles are equally applicable to, and can be implemented in, all types of network systems, and that any such variations do not depart from the true spirit and scope of the embodiments. Moreover, in the following detailed description, references are made to the accompanying figures, which illustrate specific embodiments. Changes may be made to the embodiments without departing from the spirit and scope of the embodiments.

Figure 1:
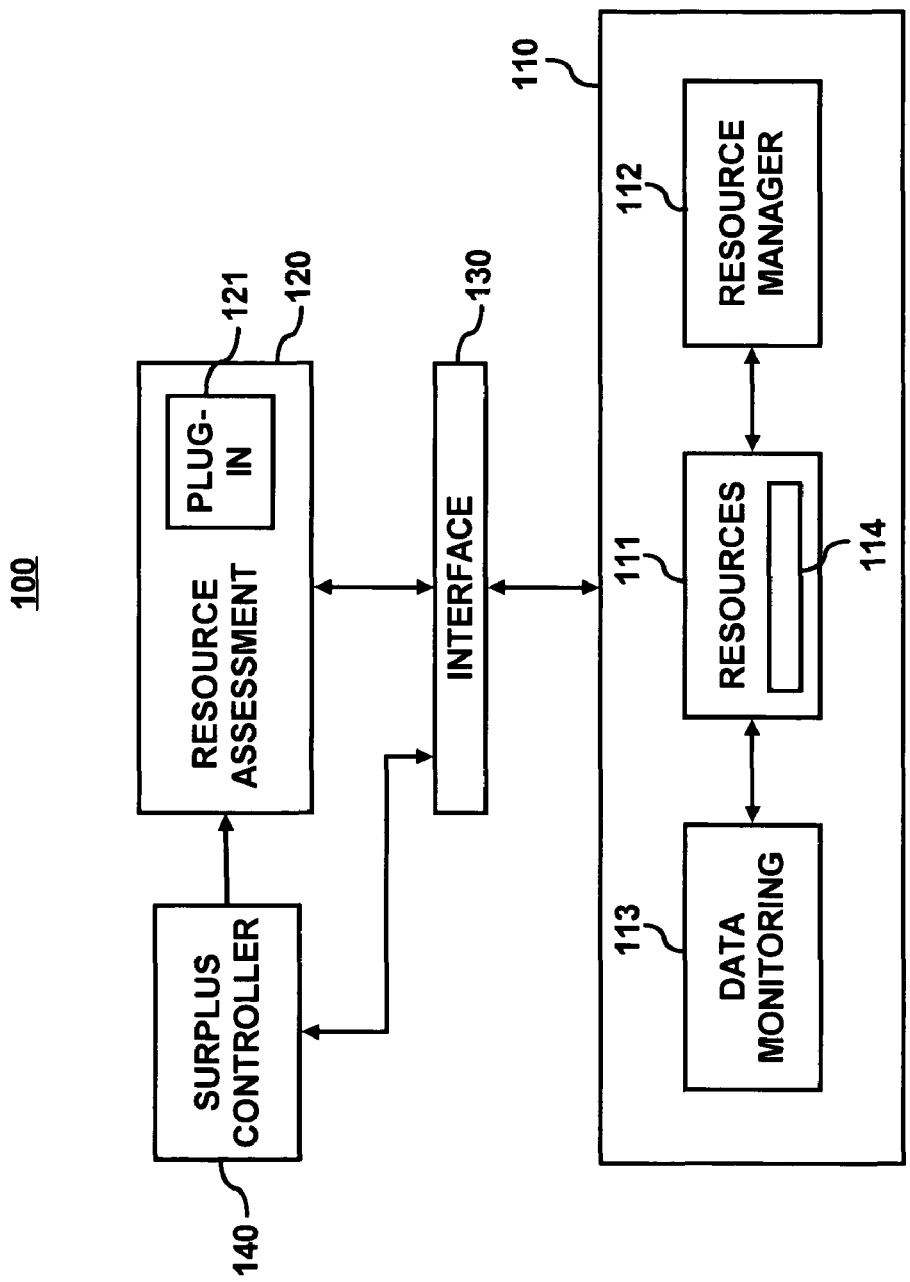
FIG. 1 illustrates a system, according to an embodiment.

FIG. 1 illustrates a system 100 according to an embodiment that provides computer resources on demand and is operable to adjust allocated computer resources as needed. The system 100 includes a resource infrastructure 110 and a resource assessment computer system 120. The resource assessment computer system 120 includes a control plug-in 121 that includes a specifiable policy for allocating computer resources in the resource infrastructure 110. The control plug-in 121 may include parameters and a control function as described in further detail below. The control plug-in 121 and other control plug-ins, not shown, may be software that is customizable and executed by the resource assessment computer system 120 for implementing different policies. Control plug-ins are described in further detail below. Furthermore, the resource assessment computer system 120 may include one or a plurality of computer systems, such as one or more servers. Each resource assessment computer system may include and run one or more control plug-ins.

The resource infrastructure 110 includes a pool of computer resources 111, a resource manager computer system 112, and a data monitoring system 113. The resource manager computer system 112 receives instructions for allocating computer resources from the pool of computer resources 111 for a user's computing needs, such as allocating computer resources for a user's application 114. Based on the instructions the resource manager computer system 112 increases or decreases the computer resources allocated for the application 114. The application 114, which is shown in the pool of computer resources 111, is running on a subset of the pool of resources 111 allocated to the application 114 by the resource manager computer system 112. The data monitoring system 113 monitors predetermined metrics of the allocated computer resources and sends monitoring data, which includes measurements of the predetermined metrics, to the resource assessment computer system 120. Examples of the predetermined metrics may include CPU utilization, process queue lengths, IO and network bandwidth, memory utilization and swap rate. If the system 100 is implemented in a data center, the metrics may be collected by data center management software. If application data monitoring is provided, application-level metrics for the application 114 can also be collected, such as transaction rates, response times, numbers of simultaneous sessions, number of users, etc.

The pool of resources 111 may include computer systems or even components of computer systems. One feature of the system 100 is that the number of resources from the pool of resources 111 allocated to an application, such as the application 114, may change during run-time depending on demand the application is facing. Those resources can be flexed which means their capacity can be varied over time. Examples of those resources may include number of CPUs, number of variable server partitions on computer systems that support CPU partitioning, number of entire servers, or varying CPU allocations for or numbers of virtual machines. Resources from the pool of resources 111 are allocated for the application 114. Allocating may include but is not limited to adding servers into an application environment, configuring the servers to run in the application environment, which may include loading the necessary software, releasing servers and un-configuring the released servers from the application environment. CPUs, virtual machines, server partitions, and other types of resources may be similarly configured or un-configured as needed. The allocated computer resources for the application 114 may be adjusted by the resource manager computer system 112.

In one embodiment, the resources are comprised of a server group including a plurality of servers of the same type. Server types may include servers for applications such as web servers, database servers, application servers, and servers used for any type of enterprise application. Examples of server types may include IA32 or 1p2000. The application 114 executed by the server group may be a horizontally-scalable application. A horizontally-scalable application is an application that runs on a number of servers in the server group simultaneously. Scalable means that the number of servers may be changed over time. Several instances of the application may be run by the server group. For example, an instance of a web application for online shopping may be duplicated for each user buying goods or services using the web application. During busy shopping seasons, the resource manager computer system 112 may increase the number of servers in the server group as needed to accommodate the heavier workload. The amount of resources allocated to the application 114 may be adjusted for several reasons, including workload, improving resource utilization (e.g., one or more servers are idle), or supporting other applications hosted by other resources from the pool of resources 111. The environment of the system 100 may be any type of resources on demand environment, which may range from grid computing services to data center services where resources are allocated as needed to one or more applications.

In one embodiment, the allocated resources are comprised of a server group including a plurality of servers of the same type. Examples of server types may include web servers, database servers, application servers, and servers used for any type of enterprise application. The application 114 executed by the server group may be a horizontally-scalable application. A horizontally-scalable application is an application that runs on a number of servers in the server group simultaneously. Several instances of the application may be run by the server group. For example, an instance of a web application for online shopping may be duplicated for each user buying goods or services using the web application. During busy shopping seasons, the resource manager computer system 112 may increase the number of servers in the server group as needed to accommodate the heavier workload. The amount of resources allocated to the application 114 may be adjusted for several reasons, including workload, improving resource utilization (e.g., one or more servers are idle), or supporting other applications hosted by other resources from the pool of resources 111. The environment of the system 100 may be any type of resources on demand environment, which may range from grid computing services to data center services where resources are allocated as needed to one or more applications.

The resource infrastructure 110 contains all the resources 111 managed by the resource manager computer system 112. The resource manager computer system 112 may be managing several different sets of allocated computer resources for different users running different applications, and the resource assessment computer system 121 may be running several different control plug-ins for each application. A protected domain is formed around the resource infrastructure 111 to prevent unauthorized access to the allocated resources and the resource manager 112, for example, from an unrelated control plug-in, a computer virus, or other unauthorized applications.

An interface 130 is used to implement a protected domain around the resource infrastructure 110. The interface 130 provides security measures for crossing protected domains, such as a domain for the resource assessment computer system 120 and a domain for the resource infrastructure 110. Examples of the data the flows between the protected domains may include requests for monitoring data, such as from the resource assessment computer system 120, and the monitoring data included in the responses to the requests, such as provided by the data monitoring system 113. Also, instructions for adjusting allocated resources may be sent from the resource assessment computer system 120 to the resource manager computer system 112 via the interface 130. Examples of the security measures provided by the interface 130 may include control plug-in authentication and establishing encrypted communication channels. Control plug-ins may be authenticated using certificates. For example, a control plug-in's certificate is validated by the interface 130. Only certificates that are registered at the interface 130 can be validated. Encrypted communication channels can be created as is known in the art. The interface 130 may include software and/or hardware in the computer assessment system 120 and the resource manager computer system 112. In one example, the Open Grid Services Infrastructure (OGSI) or the Web Service Resource (WSRF) is used to implement the interface 130. OGSI and WSRF are standards that define mechanisms for creating, managing, and exchanging information among entities. The mechanisms specified in these standards may be used to provide one or more of the security measures for the interface 130.

The resource assessment computer system 120, using the policy provided in the control plug-in 121 and the monitoring data, including the metrics from the data monitoring system 113, determines whether the application 114 and the allocated resources executing the application 114 are operating within defined bounds, such as specified in the control plug-in 121. The rules for this assessment is the policy specified in the control plug-in 121. Based on the assessment, the resource assessment computer system 120 may take corrective action, such as instructing the resource manager computer system 112 to increase or decrease the computer resources allocated to the application 114.

Policies in control plug-ins may be specified through control functions and parameters in the control plug-ins. The control function in a control plug-in may use one or more parameters for assessing allocated resources. In a simple case, a control function in a control plug-in uses upper and lower threshold parameters. For example, the control plug-in 121 specifies an upper and lower threshold for the current load level of a server group allocated for the application 114. When the load level surpasses the upper threshold, the control plug-in 121 makes a decision to flex up, i.e., add more servers into the server group. When the load level falls below the lower threshold, the control plug-in 121 decides to flex down, i.e., release servers from the server group. A third parameter may include a time interval within which load levels have to remain above the upper or below the lower threshold in order to trigger a resource adjustment. The load level may be determined by the metrics measured by the data monitoring system 113 and transmitted to the resource assessment computer system 120. For example, a current load level of a server group may be an aggregate number of metrics for each server, such as CPU load, memory usage, IO activity, and possibly other metrics.

An example of a control function used in a control plug-in may be described as follows:

F(p1, p2, p3, . . . )→newN with newN=curN (no change)
newN>curN (flex up)
newN<curN (flex down)

The control function F calculates a new target number of resources (newN) that satisfies desired performance under current conditions based on the parameters (p=p1, p2, p3 . . . ). The newN is the target number of resources, such as servers in a server group, and curN is the current number of resources allocated for an application, such as the current number of servers in a server group for the application. If the target number of servers is equal to the current number of servers, then, for example, there is no change instructed by the resource assessment computer system 120 running the above-described control plug-in. If the target number of servers is less than the current number of server, then the resource assessment computer system instructs the resource manager computer system 112 to flex up. If the target number of servers is greater than the current number of server, then the resource assessment computer system instructs the resource manager computer system 112 to flex down.

The parameters p used by the control function F may include "operational conditions" in the underlying controlled system, such as the load level in a server group. The parameters p may also describe the "desired conditions" such as boundaries or thresholds within which a control system operates, such as the control system 200 shown in FIG. 2 and described in detail below. Desired conditions also include preferences or constraints to be obeyed by the control system. An example is described below for a set of parameters p1 . . . p7 for a control function.

An example of a parameter set for operational conditions may include:

p1: LL (current load level in a server group);
p2: curN (current number of servers in a server group).

An example of a parameter set for desired conditions may include:

p3: LPSupp (upper threshold for load per server: (LL/curN), e.g. 80%);
p4: LPSlow (lower threshold for load per server: (LL/curN), e.g. 40%).

An example of hard constraints within the desired conditions may include:

p5: min_servers (minimal number of servers that must be maintained in the server group);
p6: max servers (maximal number of servers that must be maintained in the server group).

An example of preferences within the desired conditions may include:

p7: pref_LoadLevelPerServer (preferred load level of a server with: LPSlow≦pref_LoadLevelPerServer≦LPSupp).

The behavior of a control plug-in can be influenced by the parameter set p1 . . . p7. An example below includes a control function utilizing the parameter set p1 . . . p7. This control function is invoked any time a change in one of its input parameters p1 . . . p7 occurs, which may be reported to the resource assessment computer system 120 as a parameter change event from the data monitoring system 113.

int control Function(LL, curN)//arguments from parameter set p1 . . . p7
    {LLPS=LL/curN; // current load level per server
    newN=curN; // don't flex when LLPS remains within bounds
    if (LLPS>LPSupp or LLPS<LPSupp or surplusControl)
    {newN=RoundUp (LL/pref_LoadLevelPerServer);
    newN=max(min(newN, max_Servers), min_servers);}
    return newN;}

When the load per server exceeds the upper threshold or falls below the lower threshold, or the parameter set has changed, the new number of servers is calculated by:

$$newN=LL/prefLoadLevelPerServer.$$

The new number of servers is bound to constraints: newN=max(min(newN, max servers), min servers).

The control plug-ins are customizable. Adjusting any of the parameters describing desired conditions changes the control decisions made by the control plug-in. By providing a new or changing the existing parameter set p1 . . . p7, users, system administrators operators, or systems, such as a server surplus control system, can influence the result of the control function performed by the control plug-in. Also, control plug-ins may comprise software provided by the user, the system administrator, or another system. By using control plug-ins, the system 100 can easily receive and accommodate new policies for allocating the resources 111.

Furthermore, control plug-ins may be included in a hierarchal control plug-in architecture, where each intermediate layer in the hierarchy receives input that could change a parameter and generates an output, such as a control decision to change a parameter of a lower level control plug-in. At the bottom layer, the control plug-in's may output flex up or flex down instructions.

Figure 2:
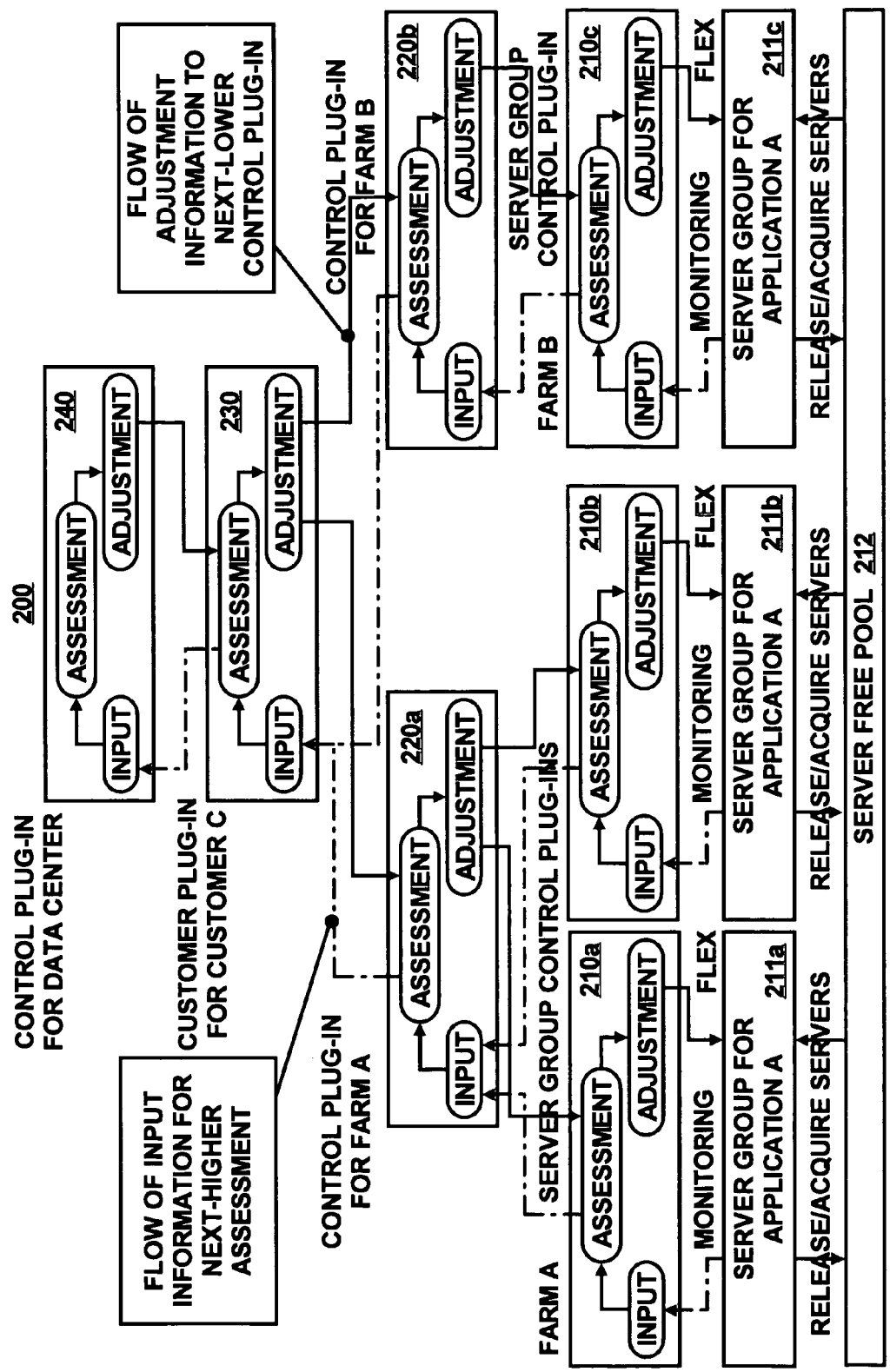
FIG. 2 illustrates a hierarchical control system comprised of the system shown in FIG. 1, according to an embodiment.

FIG. 2 illustrates a hierarchal control system 200 using a hierarchal control plug-in architecture. In the example shown in FIG. 2, servers are the resources 111 of FIG. 1 that are released from or added to server groups running applications. It will be apparent to one of ordinary skill in the art that other types of resources may also be used. Also, control plug-ins are represented using block diagrams in FIG. 2. Each control plug-in block includes an input, assessment, and adjustment function. The input function receives input data, the assessment function executes the control functions of the control plug-in, and the adjustment function may output adjustment data as determined by the assessment function. The output data may include new or adjusted parameters for a lower level control plug-in or adjustment instructions for a server group for increasing or decreasing the number of servers. The data flow of input data to a control plug-in is illustrated using dotted lines and the data flow of output data from a control plug-in is illustrated using solid lines. As shown in FIG. 2 and described in detail below, control plug-ins at intermediate levels may receive input data from lower level control plug-ins to make an assessment decision on whether to adjust parameters in a lower level control plug-in, which may result in re-allocating servers for a server group.

The system 200 includes control plug-ins at different levels of the hierarchy. The control plug-ins may be stored and executed by the resource assessment computer system 120 of FIG. 1, which may include multiple servers running one or more of the control plug-ins. In the example shown in FIG. 2, control plug-ins 210a-c at the lowest level of the hierarchy in the system 200 are each responsible for flexing server groups, such as increasing or decreasing the number of servers in the server groups 211a-c based on control functions and parameters in the control plug-ins of the system 200. As the server groups 211a-c are flexed, servers are either released to or acquired from the server free pool 212. The server free pool 212 includes the servers currently not utilized by any server groups. A single server free pool is shown in FIG. 2. However, a server free pool is provided for each application type. For example, web server application types utilize servers from a pool of web servers, and database application types utilize servers from a database server pool. Also, the server free pool 212 is part of the pool of resources 111 shown in FIG. 1 and is monitored by the data monitoring system 113. The data monitoring system 113 sends metrics to the surplus controller 140, which may be used to determine the surplus server capacity, such as the number of unutilized servers.

The input data for the control plug-ins 210a-c may include monitoring data from the data monitoring system 113 shown in FIG. 1 measuring metrics for each server group. The output data may include instructions for flexing a server group if needed.

One or more server groups running an application are referred to as a farm. For example, the server groups 211a-b run instances of the application A and are in the farm A. The server group 211c is in the farm B and runs instances of the application B. The control plug-ins 220a-b are in an intermediate level of the hierarchy in the system 200 and include control functions for controlling farms. The control plug-ins 220a and 210a-b include control functions for allocating servers for the farm A, and the control plug-ins 220b and 210c include control functions for allocating servers for the farm B. The control plug-ins 220a-b receive data assessment information from respective lower level control plug-ins and may output adjustment data including adjusted parameters for the control functions of the respective lower level control plug-ins. Adjusted parameters may include new parameter values for a parameter set. The adjustment data may include but is not limited to revised thresholds for the parameters for the lower level plug-ins such that unutilized servers in the server free pool 212 are allocated or to re-allocate servers to server groups that need them.

The control plug-in 230 is at the customer level and includes control functions for administering policies, for example, for customer C. For example, customer C may desire better performance for application A, and thus new parameters may be output to the control plug-in 220a resulting in an increased number of servers being allocated for the server groups 211a-b. The control plug-in 240 is at the data center level and may include control functions for administering data center policies. For example, the servers in the server groups 211a-c and the server free pool 212 may be provided in a data center and subject to the policies of the data center.

Figure 3:
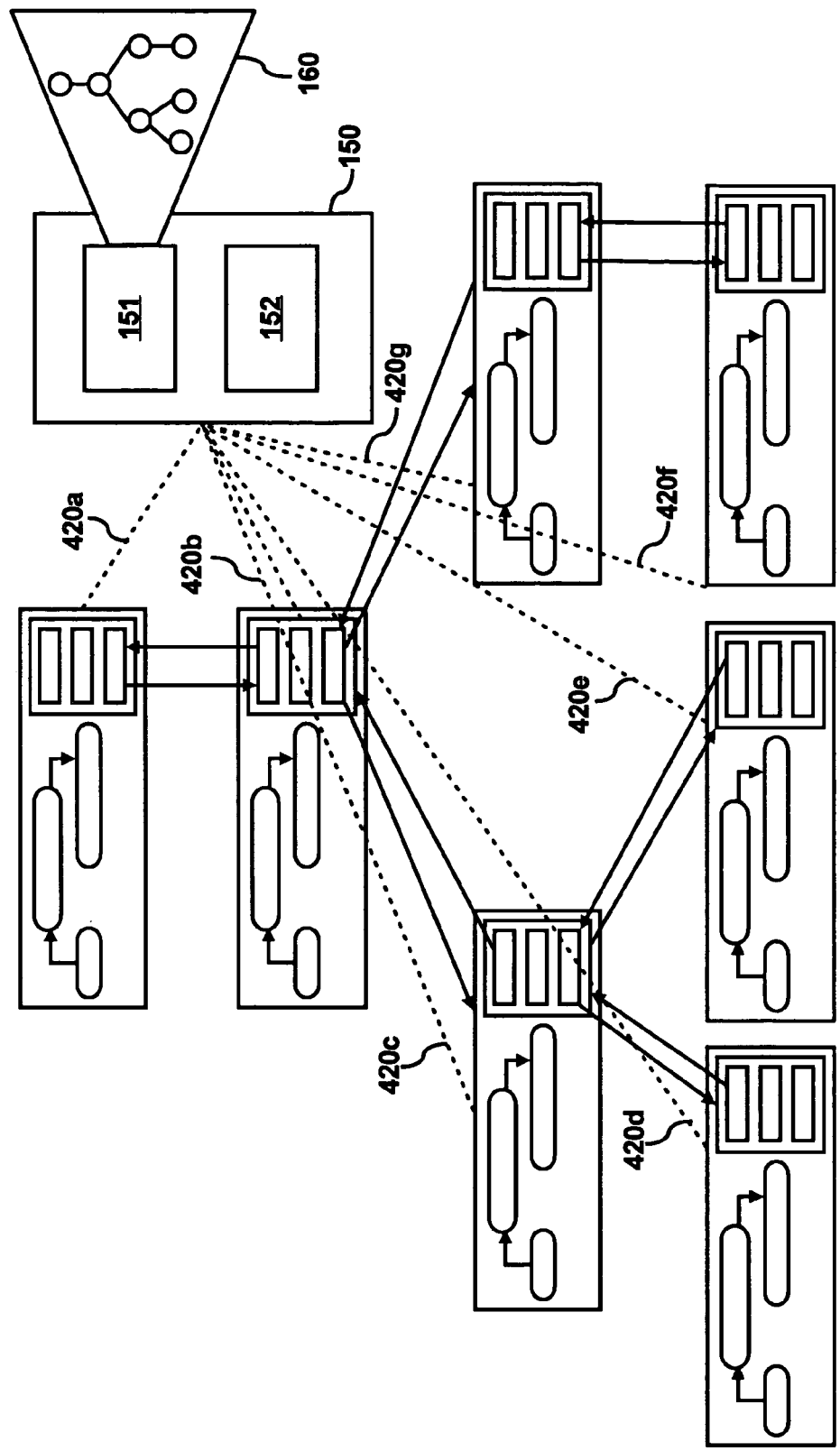
FIG. 3 illustrates a surplus controller adjusting parameters of one or more control plug-ins to control the utilization of unutilized servers, according to an embodiment.

FIG. 3 illustrates the surplus controller 140 of FIG. 1 adjusting parameters of one or more control plug-ins to control the utilization of surplus servers. The surplus controller 140 oversees the server free pool 212 and decides whether surplus server capacity from the server free pool 212 can be distributed across the server groups 211a-c, thereby improving the behavior of existing applications A and B.

The surplus controller 140 determines whether sufficient amount of servers are in the server free pool 212, such as whether server capacity in the server free pool is above a threshold or below a threshold. The server free pool 212 comprises unutilized servers in this example. If a sufficient number of servers are unutilized, the surplus controller 140 selects one or more server groups to receive the unutilized servers and determines how to distribute the unutilized servers. The surplus controller 140 determines which customer, which application, or which server group receives the surplus server capacity, such as described in detail below. For example, the surplus controller 140 receives parameter sets from the control plug-ins of FIG. 2. Data flowing between the control plug-ins and the surplus controller 140 is illustrated with dashed lines. The surplus controller 140 then contacts one or more control plug-ins and changes parameter sets in order to make server groups associated with the control plug-ins acquire the surplus server capacity. It should be noted that if parameters for control plug-ins at the customer or application levels are modified, the surplus servers are ultimately allocated to a server group for that application or customer.

The surplus controller 140 is also operable to perform a similar process in the reverse direction when server capacity in the server free pool falls below desired levels. The surplus controller 140 selects control plug-ins and changes their parameter sets such that they release the previously acquired server capacity.

Policy in the surplus controller 140, which is used to determine which customer, which application, or which server group receives the surplus server capacity, may be determined and input into the surplus controller 140 by a system administrator via an administrator console 141. Control plug-ins with control functions and parameters for administering the desired policy may be transmitted to the surplus controller 140 via the administrator console 141.

Multiple server types may co-exist in the pool of resources 111 shown in FIG. 1. Server free pools for the pool of resources 111, which include the server free pool 212 shown in FIG. 2, are grouped by server types. Server free pools of different types are independent from each other and managed separately. Surplus server capacity for a particular server type is assigned to server groups of the same server type. One application receives surplus servers from an associated server free pool.

As described above, the surplus controller 140 makes decisions, such as whether surplus server capacity is available for a server type, and if so, how the surplus server capacity is distributed among server groups with servers of that type. Also, the surplus controller 140 is operable to restore distributed surplus capacity and thus keeps the state about which applications and what server groups have received surplus servers. In one embodiment, the surplus controller 140 maintains two data structures for performing these functions. One data structure is the base control matrix (BCM), shown in FIG. 4A. The BCM contains all parameter sets obtained from control plug-ins, such as the control plug-ins shown in FIGS. 2 and 3. The second data structure is the adjustment control matrix (ACM) shown in FIG. 4C. The ACM contains all adjustments the surplus controller 140 has made to parameter sets of control plug-ins. Both data structures are used by the surplus controller 140 to make decisions of how surplus server capacity is distributed across server groups if available and how the parameter sets for the control functions in control plug-ins are to be adjusted such that selected server groups absorb the intended surplus server capacity.

FIG. 4A shows an example of a BCM 310. At the beginning of a control cycle, the surplus controller 140 obtains all parameters sets from control plug-ins for server groups sg1 . . . sgj. In this example, the parameters received by surplus controller 140 from the control plug-ins are the parameters p1-p7 described above. The server groups sg1 . . . sgj may be included in the resources 111 of FIG. 1. Parameter p1 is a current load level (LL) in a server group, such as determined from monitoring data from the data monitoring system 113 shown in FIG. 1. The parameter p2 is the current number of servers (curN) in a server group. The parameters p3-p7 are parameters for desired conditions, constraints, and preferences. Parameters for desired conditions, constraints and preferences, such as parameters p3-p7 shown in the dashed box, may be changed by the surplus controller 140 but input parameters, such as parameters p1 and p2, may not be changed. Parameters that can be changed, such as the parameters p3-p7, are called eligible parameters.

The BMC 310 shows that currently 22 servers are assigned to the server group sg4 at a total load level for the server group of 1760. The parameter p7 is a preference for the load per server and is 80%.

Next, the surplus controller 140 computes a distribution of how a given number of surplus servers are distributed across the server groups sg1 . . . sgj. The surplus servers are the servers in the server free pool 212 of FIG. 3. Various policies can be applied in order to make that distribution. One policy for distributing surplus server capacity may be that surplus servers are distributed evenly across all existing applications. Another policy may incorporate priorities assigned to applications. Some applications of higher priority would receive more surplus capacity than others. A third policy may be to predetermine a subset of applications that would receive surplus server capacity if it exists.

The result of the distribution is stored in a vector Dsur [sg1 . . . sgj] shown in FIG. 4B which contains the number of surplus servers that are to be assigned to each server group sg1 . . . sgj. The sum of the number of servers in Dsur corresponds to the total number of surplus servers to be distributed.

In the example shown in FIG. 4B, the surplus controller 140 determines based on the distribution policy being administered by the surplus controller 140 that a total of 6 surplus servers are distributed across the server groups sg1 . . . sgj. In particular, the server group sg4 is to receive 2 surplus servers and the server group sg6 is to receive 4 surplus servers.

The next step is to alter one or more of the eligible parameters in order to achieve the desired changes in calculated target numbers that would result in the desired server allocation to the server groups. For example, the parameter p7 is selected by the surplus controller 140 to initiate the change. Based on the numbers in BCM 310, the surplus controller 140 determines that the preferred load per server must be lowered by 7% from 80% to 73% for sg4. Then, the control function will compute 24 (1760/73) as the new number of target servers, and thus sg4 will absorb the 2 surplus servers. The 2 surplus servers are released by sg4 when p7 is restored to 80% by the surplus controller 140, such as when the load for another server group increases. Similarly, p7 for sg6 is increased by 10% in order for the control function to compute new target numbers, such that sg6 absorbs 6 surplus servers. These servers may be released by sg6 as determined by the surplus controller 140. It will be apparent to one of ordinary skill in the art that other eligible parameters may be changed to influence the control functions to absorb the assigned surplus servers as desired.

The changes made to any of the parameters p1 . . . p7 are maintained in the ACM 320 shown in FIG. 4C in order to be able to restore initial conditions when surplus servers are to be regained. The parameter set a1-a7 store the changes made to the corresponding parameters p1-p7. For example, a2 for sg4 and sg6 stores the change in target servers for those server groups, and a7 stores the changes to p7 for sg4 and sg6.

Figure 5:
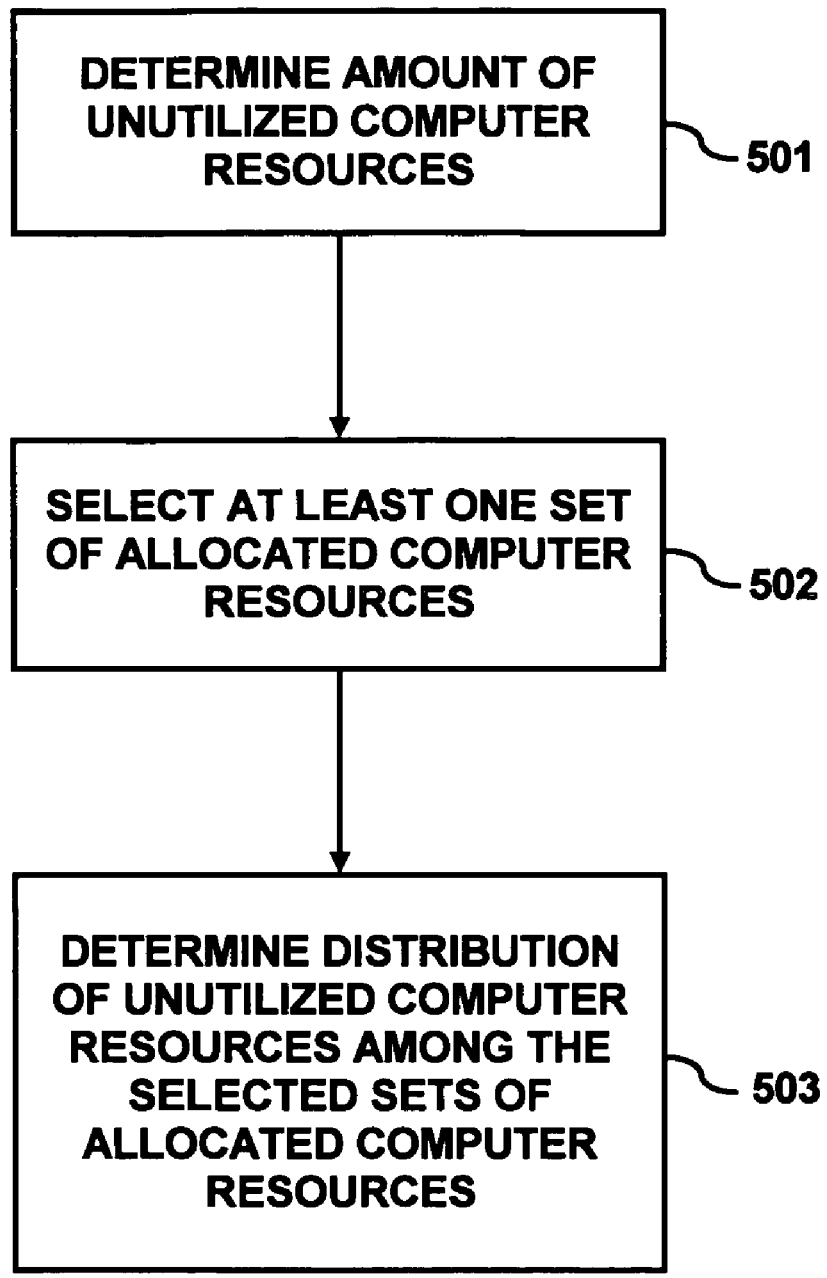
FIG. 5 illustrates a flow chart of a method for determining a distribution of unutilized computer resources, according to an embodiment.

FIG. 5 illustrates a flow chart of a method 500 for determining a distribution of unutilized resources, according to an embodiment. The method 500 is described with respect to FIGS. 1-3 by way of example and not limitation.

At step 501, the surplus controller 140 determines an amount of unutilized resources from the pool of resources 111 shown in FIG. 1. In one example, the pool of resources 111 includes the server free pool 212 shown in FIGS. 2 and 3. The amount of unutilized resources is the number of unutilized servers.

At step 502, the surplus controller 140 selects at least one set of resources previously allocated to execute the at least one application. For example, the previously allocated resources include the servers in the server groups 211*a*-*c* shown in FIG. 2. The surplus controller 140 selects one or more of the server groups 211*a*-*c* to receive the unutilized servers. The surplus controller 140 may select a customer, an application, or one or more server groups to receive the unutilized servers. Then, the surplus controller 140 modifies parameters for control plug-ins, such that the unutilized servers are allocated to the server group selected, which may be associated with the selected customer, application, or server group.

At step 503, the surplus controller 140 determines a distribution for unutilized resources from the pool of resources 111. For example, 6 servers are to be distributed among the server groups selected at step 211*a*-*c*. The surplus controller determines how many of the unutilized servers each selected server groups are to receive. Then, the surplus controller 140 modifies control parameters for plug-ins associated with the selected server groups such that the selected server groups absorb the unutilized servers.

Figure 6:
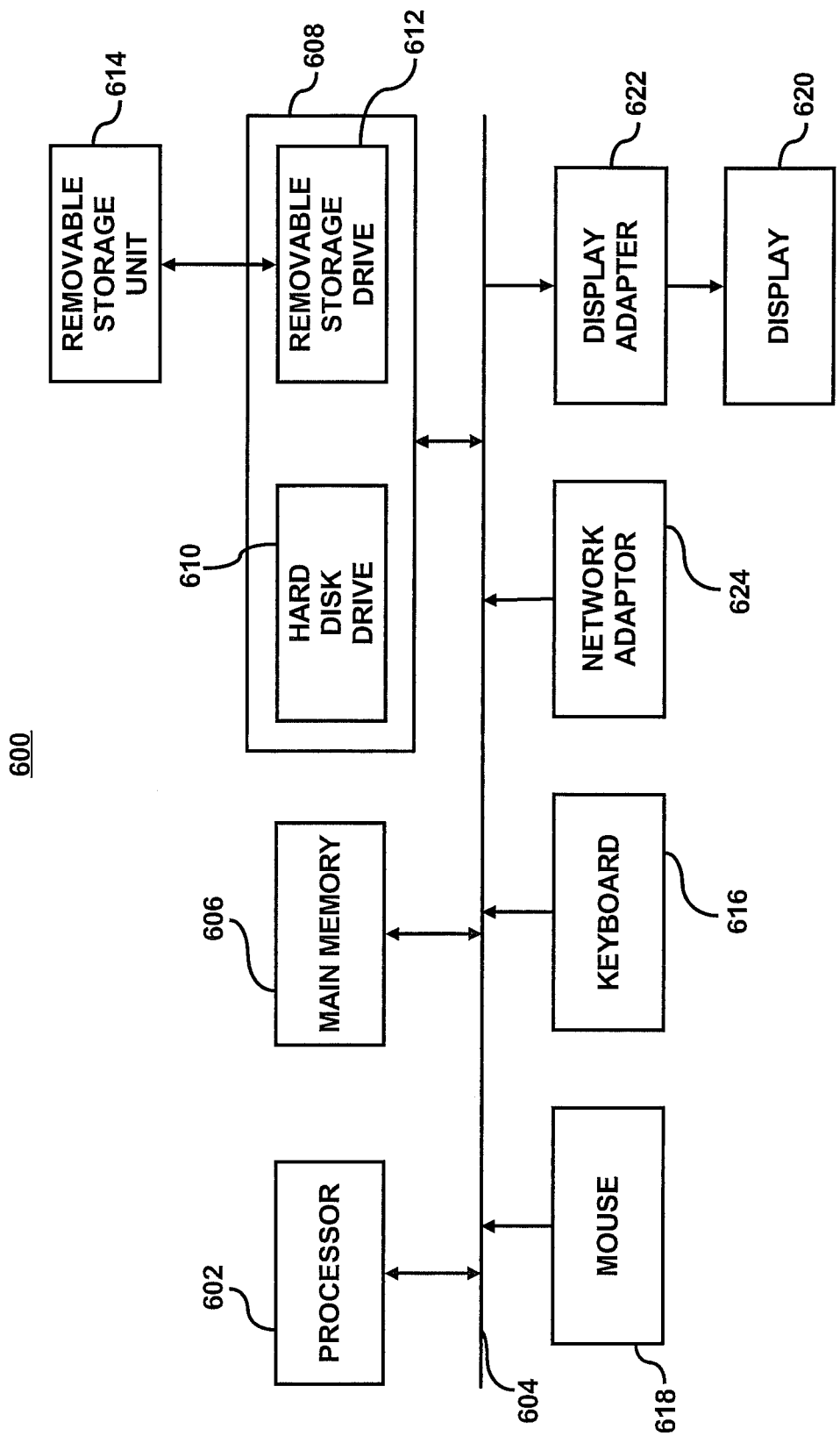
FIG. 6 illustrates a computer system, according to an embodiment.

FIG. 6 illustrates a block diagram of a general purpose computer system 600 that may be used for the surplus controller 160. It will be apparent to one of ordinary skill in the art that a more sophisticated computer system may be used. Furthermore, components may be added or removed from the computer system 600 to provide the desired functionality.

The computer system 600 includes one or more processors, such as processor 602, providing an execution platform for executing software. Commands and data from the processor 602 are communicated over a communication bus 606. The computer system 600 also includes a main memory 606, such as a Random Access Memory (RAM), where software may be resident during runtime, and a secondary memory 608. The secondary memory 608 includes, for example, a hard disk drive 610 and/or a removable storage drive 612, representing a floppy diskette drive, a magnetic tape drive, a compact disk drive, etc., or a nonvolatile memory where a copy of the software may be stored. The secondary memory 608 may also include ROM (read only memory), EPROM (erasable, programmable ROM), EEPROM (electrically erasable, programmable ROM). The removable storage drive 612 reads from and/or writes to a removable storage unit 616 in a well-known manner.

The computer system 600 may include user interfaces comprising one or more input devices 628, such as a keyboard, a mouse, a stylus, and the like. The display adaptor 622 interfaces with the communication bus 606 and the display 620 and receives display data from the processor 602 and converts the display data into display commands for the display 620. The input devices 628, the display 620, and the display adaptor 622 are optional. An administrator console, such as the administrator console 141 shown in FIG. 1, may be used as a user interface. A network interface 630 is provided for communicating with other computer systems.

The steps of the method 500 may be implemented as software embedded on a computer readable medium, such as the memory 606 and/or 608, and executed on the computer system 600, for example, by the processor 602.

The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

While the embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. A method comprising:
   determining, using a computer system, an amount of unutilized resources from a pool of resources operable to be allocated for executing at least one application;
   selecting at least one set of resources previously allocated to execute the at least one application;
   determining a distribution of the amount of unutilized resources among the selected at least one set of resources, comprising:
      adding resources to the at least one set of resources previously allocated to execute the at least one application when a metric associated with the at least one set of resources surpasses an upper threshold, and
      releasing unutilized resources from the at least one set of resources previously allocated to execute the at least one application when the metric associated with the at least one set of resources is below a lower threshold;
   determining a set of parameters used by a control plug-in to control allocated resources, wherein the set of parameters define a policy in the control plug-in to control the allocated resources; and
   selecting at least one parameter of the set of parameters to modify to achieve the determined distribution.

2. The method of claim 1, wherein selecting at least one parameter of the set of parameters to modify to achieve the determined distribution further comprises:
   calculating a new parameter value for each of the at least one selected parameters to achieve the determined distribution.

3. The method of claim 2, further comprising:
   storing a change between the new parameter value and an original parameter value for each of the at least one selected parameters; and
   restoring the original parameter value for each of the at least one selected parameters using the stored change for each of the at least one selected parameters.

4. The method of claim 1, wherein determining an amount of unutilized resources from of pool of resources operable to be allocated for executing at least one application further comprises:
   determining an amount of unutilized servers for a server free pool.

5. The method of claim 4, wherein selecting at least one set of resources previously allocated to execute the at least one application further comprises:
   selecting at least one server group.

6. The method of claim 5, wherein determining a distribution of the amount of unutilized resources among the at least one set of resources further comprises:
   determining a distribution of the unutilized servers among the at least one server group.

7. The method of claim 1, wherein the metric associated with the at least one set of resources is CPU utilization, process queue lengths, IO and network bandwidth, memory utilization or swap rate.

8. A system comprising:
   a resource assessment computer system including control plug-ins for determining an amount of unutilized resources from of a pool of computer resources and whether to adjust computer resources allocated from the pool of computer resources to execute the application; and
   a surplus controller controlling the distribution of unutilized computer resources from the pool of computer resources to the allocated computer resources,
   wherein the control plug-ins include an upper threshold and a lower threshold;
   wherein when a metric associated with the computer resources allocated to execute the application surpasses the upper threshold, the control plug-ins add resources to the allocated computer resources, and when the metric associated with the computer resources allocated to execute the application is below the lower threshold, the control plug-ins release unutilized computer resources allocated to execute the application; and
   wherein the surplus controller receives parameters used by the control plug-ins, the parameters defining a policy for allocating the unutilized resources, and selects at least one of the parameters to modify to distribute the unutilized computer resources.

9. The system of claim 8, further comprising:
   a resource manager computer system allocating the computer resources from a pool of computer resources for executing an application.

10. The system of claim 8, further comprising:
    a data monitoring system monitoring the metrics for the allocated computer resources.

11. The system of claim 10, wherein the surplus controller determines whether to distribute unutilized computer resources based on the metrics from the data monitoring system.

12. The system of claim 10, wherein the resource assessment computer system determines whether to adjust the computer resources based on the metrics from the data monitoring system.

13. The system of claim 8, wherein the surplus controller selects a subset of the allocated resources to receive the surplus servers.

14. The system of claim 8, wherein the pool of resources comprises servers operable to run a horizontally scalable application.

15. The system of claim 14, wherein the allocated resources comprise server groups.

16. An apparatus comprising:
control plug-ins determining an amount of unutilized resources from a pool of computer resources and whether to adjust computer resources allocated to execute the application from the pool of computer resources; and
a processor to modify parameters used by the control plug-ins to control the distribution of unutilized computer resources from the pool of computer resources to at least some of the allocated computer resources,
wherein the control plug-ins include an upper threshold parameter and a lower threshold parameter;
wherein when a metric associated with the computer resources allocated to execute the application surpasses the upper threshold parameter, the control plug-ins add resources to the allocated computer resources, and when the metric associated with the computer resources allocated to execute the application is below the lower threshold parameter, the control plug-ins release unutilized computer resources allocated to execute the application; and
wherein a surplus controller receives parameters used by the control plug-ins, the parameters defining a policy for allocating the unutilized resources, and selects at least one of the parameters to modify to distribute the unutilized computer resources.

17. A computer program provided on a computer readable storage device and comprising code that when executed causes a computer to perform the following:
determining an amount of unutilized resources from of pool of resources operable to be allocated for executing at least one application;
selecting at least one set of resources previously allocated to execute the at least one application;
determining a distribution of the amount of unutilized resources among the at least one set of resources, comprising:
adding resources to the at least one set of resources previously allocated to execute the at least one application when a metric associated with the at least one set of resources surpasses an upper threshold, and
releasing unutilized resources from the at least one set of resources previously allocated to execute the at least one application when the metric associated with the at least one set of resources is below a lower threshold;
determining a set of parameters used by a control plug-in to control allocated resources, wherein the set of parameters define a policy in the control plug-in to control the allocated resources; and
selecting at least one parameter of the set of parameters to modify to achieve the determined distribution.

\* \* \* \* \*

UNITED STATES PATENT AND TRADEMARK OFFICE
CERTIFICATE OF CORRECTION

PATENT NO. : 8,024,736 B1  
APPLICATION NO. : 11/046334  
DATED : September 20, 2011  
INVENTOR(S) : Sven Graupner et al.

Page 1 of 1

It is certified that error appears in the above-identified patent and that said Letters Patent is hereby corrected as shown below:

In column 12, line 10, in Claim 4, after "from" delete "of" and insert -- a --, therefor.

In column 12, line 31, in Claim 8, after "from" delete "of".

In column 14, line 7, in Claim 17, after "from" delete "of" and insert -- a --, therefor.

Signed and Sealed this  
First Day of May, 2012

David J. Kappos  
*Director of the United States Patent and Trademark Office*